United States Patent
Dave et al.

(10) Patent No.: US 12,541,729 B2
(45) Date of Patent: Feb. 3, 2026

(54) METHOD AND SYSTEM FOR DYNAMICALLY RECOMMENDING COMMANDS FOR PERFORMING A PRODUCT DATA MANAGEMENT OPERATION

(71) Applicant: Siemens Industry Software Inc., Plano, TX (US)

(72) Inventors: Manal Dave, Surat (IN); Rohit Bhise, Pune (IN); Sankalp Yerawar, Pune (IN); Ajay Gandhe, Pune (IN)

(73) Assignee: Siemens Industry Software Inc., Plano, TX (US)

( * ) Notice: Subject to any disclaimer, the term of this patent is extended or adjusted under 35 U.S.C. 154(b) by 320 days.

(21) Appl. No.: 18/039,519

(22) PCT Filed: Apr. 28, 2021

(86) PCT No.: PCT/US2021/029575
§ 371 (c)(1),
(2) Date: May 31, 2023

(87) PCT Pub. No.: WO2022/119596
PCT Pub. Date: Jun. 9, 2022

(65) Prior Publication Data
US 2024/0005235 A1   Jan. 4, 2024

(30) Foreign Application Priority Data

Dec. 4, 2020 (IN) .............................. 202031052873

(51) Int. Cl.
*G06Q 10/0631* (2023.01)
*G06F 16/00* (2019.01)
(Continued)

(52) U.S. Cl.
CPC ....... *G06Q 10/06312* (2013.01); *G06F 16/00* (2019.01); *G06F 16/1873* (2019.01);
(Continued)

(58) Field of Classification Search
CPC ...... G06F 16/00; G06F 16/219; G06F 16/337; G06F 16/1873; G06Q 10/04; G06Q 10/06312
See application file for complete search history.

(56) References Cited

U.S. PATENT DOCUMENTS

2011/0208822 A1* 8/2011 Rathod .................. G06Q 30/02
                                                    709/206
2014/0129942 A1* 5/2014 Rathod ............ H04N 21/44226
                                                    715/720
(Continued)

FOREIGN PATENT DOCUMENTS

GB          2513709 A     11/2014

OTHER PUBLICATIONS

International Search Report and Written Opinion for International Application No. PCT/US2021/029575 mailed Jul. 1, 2021.

*Primary Examiner* — Tarek Chbouki
(74) *Attorney, Agent, or Firm* — Lempia Summerfield Katz LLC

(57) ABSTRACT

A method and system for dynamically recommending commands for performing a PDM operation on product data objects in a product data management environment is disclosed. In one embodiment, a method includes determining a context in which a user is operating within a product data management environment. The method includes dynamically determining a set of commands suitable for performing a candidate PDM operation on the product data objects based on the determined context. Furthermore, the method includes computing a score for each of the commands suitable for performing the candidate PDM operation on the (Continued)

product data objects. Moreover, the method includes assigning a rank to each command suitable for performing the candidate PDM operation based on the score associated with each command, and outputting one or more commands from the set of commands on a graphical user interface based on the rank assigned to each command.

14 Claims, 4 Drawing Sheets

(51) Int. Cl.
  *G06F 16/18* (2019.01)
  *G06F 16/21* (2019.01)
  *G06F 16/335* (2019.01)
  *G06Q 10/04* (2023.01)

(52) U.S. Cl.
  CPC .......... *G06F 16/219* (2019.01); *G06F 16/337* (2019.01); *G06Q 10/04* (2013.01)

(56) References Cited

U.S. PATENT DOCUMENTS

| | | | |
|---|---|---|---|
| 2015/0120702 A1* | 4/2015 | Suh | G06F 16/444 707/722 |
| 2016/0373165 A1* | 12/2016 | Augusto Di Grandi Nery | H04M 3/42229 |
| 2017/0061286 A1* | 3/2017 | Kumar | G06Q 30/0269 |
| 2017/0132331 A1* | 5/2017 | Pepakayala | G06F 16/24575 |
| 2018/0367484 A1* | 12/2018 | Rodriguez | H04L 67/75 |
| 2020/0013104 A1* | 1/2020 | Yamauchi | G06Q 10/087 |
| 2020/0027040 A1 | 1/2020 | Yuan et al. | |
| 2021/0089860 A1* | 3/2021 | Heere | G06N 20/00 |
| 2021/0096852 A1* | 4/2021 | Stump | G06N 20/00 |
| 2021/0224837 A1* | 7/2021 | Mazumder | G06Q 30/0631 |

* cited by examiner

METHOD AND SYSTEM FOR DYNAMICALLY RECOMMENDING COMMANDS FOR PERFORMING A PRODUCT DATA MANAGEMENT OPERATION

The present patent document is a § 371 nationalization of PCT Application Serial No. PCT/US2021/029575, filed Apr. 28, 2021, designating the United States, which is hereby incorporated by reference, and this patent document also claims the benefit of Indian Patent Application No. 202031052873, filed Dec. 4, 2020.

FIELD OF TECHNOLOGY

The present disclosure generally relates to field of product data management systems, and more particularly to a method and system for dynamically recommending commands for performing a product data management (PDM) operation on product data and process-related information in a product data management environment.

BACKGROUND

Product data management (PDM) system is a software-based system that enables users to manage product data and process-related information such as computer-aided design (CAD) data, models, parts information, manufacturing information, requirements, notes, and documents. A user may perform one or more operations on product data objects (e.g., bill of materials, CAD model file, etc.) in a product data management environment to accomplish tasks associated with product lifecycle management. These PDM operations are performed on the product data objects using one or more commands. However, every user may not be proficient with the product data management system (e.g., an expert user vs novice user). For example, the expert user may use commands in a sequence that is optimized over time to perform the operations on the product data objects. The novice user may not have access to the sequence of commands used by the expert user, leading to erroneous and time-consuming operations.

SUMMARY

The scope of the present disclosure is defined solely by the appended claims and is not affected to any degree by the statements within this description. The present embodiments may obviate one or more of the drawbacks or limitations in the related art. A method and system for dynamically recommending commands for performing a product data management (PDM) operation on one or more product data objects in a product data management environment is disclosed.

In one aspect, a method includes determining a context in which a user is operating within a product data management environment, and dynamically determining a set of commands which are suitable for performing at least one candidate PDM operation on one or more product data objects in the product data management environment from a plurality of commands based on the determined context. The method includes computing a score for each of the commands suitable for performing the at least one candidate PDM operation on the one or more product data objects, and assigning a rank to each command suitable for performing the at least one candidate PDM operation on the one or more product data objects based on the score associated with each command. Moreover, the method includes outputting one or more commands from the set of commands on a graphical user interface based on the rank assigned to each command.

The method may include performing the at least one candidate PDM operation on the product data objects in the product data management environment using at least one command from the one or more commands.

In determining the context in which the user is operating within the product data management environment, the method may include determining a working area in the product data management environment in which the user is operating, determining type of the one or more product data objects selected by the user in the determined working area in the product data management environment, determining quantity of the one or more product data objects selected by the user in the determined working area in the product data management environment, and determining a previous command used by the user in the product data management environment.

In dynamically determining the set of commands which are suitable for performing at least one candidate PDM operation on the one or more product data objects in the product data management environment, the method may include determining at least one candidate PDM operation likely to be performed by the user on the one or more product data objects in the product data management environment based on the determined context, and dynamically determining the set of commands suitable for performing the candidate PDM operation on the one or more product data objects in the product data management environment from the plurality of commands.

In computing the score for each of the commands suitable for performing the at least one candidate PDM operation, the method may include computing the score for each of the commands suitable for performing the at least one candidate PDM operation based on a combination of weight values associated with each command, number of clicks executed in the past to use each command, and time elapsed since each command was last used by the user. The combination of weight values may include a first weight value based on behavior of other users and a second weight value based on behavior of the user.

The method may include capturing one or more commands used by other users for performing the candidate PDM operation on the one or more product data objects in the working area in the product data management environment, and computing the first weight value associated with the one or more commands based on the captured commands.

The method may include computing the second weight value associated with each command based on the behavior of the user. The behavior of user is based on history of usage of the command to perform the candidate PDM operation on the one or more product data objects in the working area. The method may include increasing the second weight value associated with each command based on confirmation of relevance of each command by the user. The method may include decreasing the second weight value associated with each command based on confirmation of non-relevance of each command by the user.

In another aspect, a product data management system includes one or more processing units; and a memory unit communicatively coupled to the one or more processing units. The memory unit includes a command recommendation module configured to determine a context in which a user is operating within a product data management environment, dynamically determine a set of commands which are suitable for performing at least one candidate PDM operation in the product data management environment from a plurality of commands based on the determined context, compute a score for each of the commands suitable for performing the at least one candidate PDM operation on the one or more product data objects. The command recommendation module is configured to assign a rank to each command suitable for performing the at least one candidate PDM operation on the one or more product data objects based on the score associated with each command, and output one or more commands from the set of commands on a graphical user interface based on the rank assigned to each command. The command recommendation module may be configured to perform the at least one candidate PDM operation on the one or more product data objects in the product data management environment using at least one command from the one or more commands.

In determining the context in which the user is operating within the product data management environment, the command recommendation module may be configured to determine a working area in the product data management environment in which the user is operating, determine type of the one or more product data objects selected by the user in the determined working area in the product data management environment, determine quantity of the product data objects selected by the user in the determined working area in the product data management environment, and determine a previous command used by the user in the product data management environment.

In dynamically determining the set of commands which are suitable for performing at least one candidate PDM operation on the one or more product data objects in the product data management environment, the command recommendation module may be configured to determine at least one candidate PDM operation likely to be performed by the user on the one or more product data objects in the product data management environment based on the determined context, and dynamically determine the set of commands suitable for performing the candidate PDM operation on the product data objects in the product data management environment from the plurality of commands.

In computing the score for each of the commands suitable for performing the at least one candidate PDM operation on the one or more product data objects, the command recommendation module may be configured to compute the score for each of the commands suitable for performing the at least one candidate PDM operation on the one or more product data objects based on a combination of weight values associated with each command, number of clicks executed in the past to use each command, and time elapsed since each command was last used by the user. The combination of weight values may include a first weight value based on behavior of other users and a second weight value based on behavior of the user.

Furthermore, the command recommendation module may be configured to capture one or more commands used by other users for performing the candidate PDM operation on the product data objects in the working area in the product data management environment, and compute the first weight value associated with the one or more commands based on the captured commands.

Additionally, the command recommendation module may be configured to compute the second weight value associated with each command based on the behavior of the user. The behavior of user may be based on history of usage of the commands to perform the candidate PDM operation on the one or more product data objects in the working area. The command recommendation module may be configured to increase the second weight value associated with each command based on confirmation of relevance of each command by the user. The command recommendation module may be configured to decrease the second weight value associated with each command based on confirmation of non-relevance of each command by the user.

In yet another aspect, a non-transitory computer-readable storage medium, having machine-readable instructions stored therein, that when executed by one or more processing units, cause the one or more processing units to perform a method described above.

This summary is provided to introduce a selection of concepts in a simplified form that are further described below in the following description. It is not intended to identify features or essential features of the claimed subject matter. Furthermore, the claimed subject matter is not limited to implementations that solve any or all disadvantages noted in any part of this disclosure.

DETAILED DESCRIPTION

Figure 1:
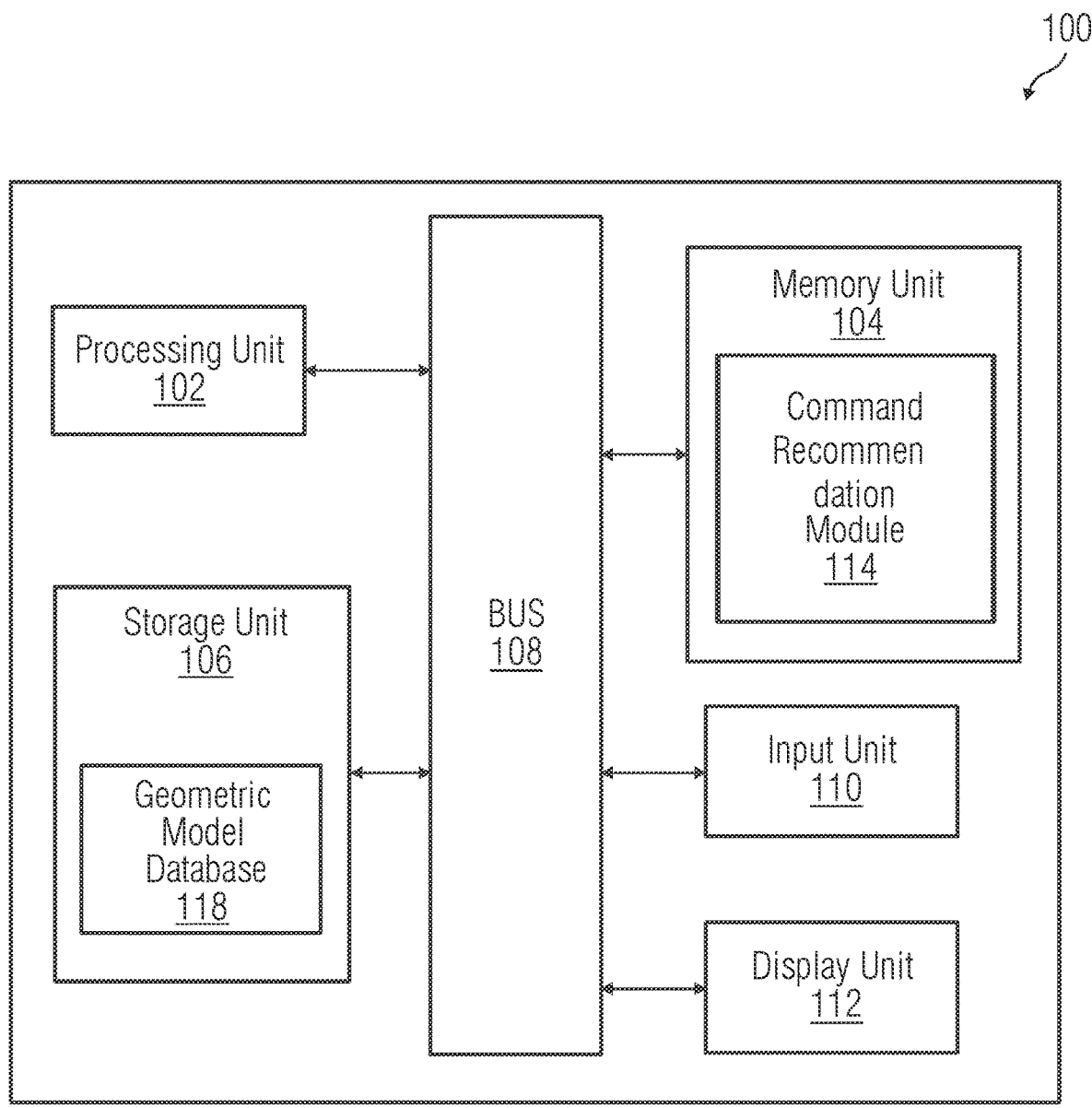
FIG. 1 is a block diagram of an exemplary product data management system capable of recommending commands to perform a PDM operation on product data objects in a product data management environment, according to one embodiment.

A method and system for dynamically recommending commands for performing an operation in a product data management environment is disclosed. Various embodiments are described with reference to the drawings, where like reference numerals are used in reference to the drawings. Like reference numerals are used to refer to like elements throughout. In the following description, numerous specific details are set forth in order to provide a thorough understanding of embodiments. These specific details need not be employed to practice embodiments. In other instances, well known materials or methods have not been described in detail in order to avoid unnecessarily obscuring embodiments. While the disclosure is susceptible to various modifications and alternative forms, specific embodiments thereof are shown by way of example in the drawings and will herein be described in detail. There is no intent to limit the disclosure to the particular forms disclosed. Instead, the disclosure is to cover all modifications, equivalents, and alternatives falling within the spirit and scope of the present disclosure.

FIG. 1 is a block diagram of an exemplary product data management system 100 capable of recommending commands to perform a PDM operation on a product data object in a product data management environment, according to one embodiment. The product data management system 100 may be a personal computer, workstation, laptop computer, tablet computer, and the like. In FIG. 1, the product data management system 100 includes a processing unit 102, a memory unit 104, a storage unit 106, a bus 108, an input unit 110, and a display unit 112. The product data management system 100 is a specific purpose computer configured to manage product data and process-related information in a single, central system. This information includes computer-aided design (CAD) data, models, parts information, manufacturing instructions, requirements, notes and documents. In one embodiment, the product data management system 100 is configured to recommend commands to perform operation on an object (e.g., product data object) in a product data management environment.

The processing unit 102, as used herein, means any type of computational circuit, such as, but not limited to, a microprocessor, microcontroller, complex instruction set computing microprocessor, reduced instruction set computing microprocessor, very long instruction word microprocessor, explicitly parallel instruction computing microprocessor, graphics processor, digital signal processor, or any other type of processing circuit. The processing unit 102 may also include embedded controllers, such as generic or programmable logic devices or arrays, application specific integrated circuits, single-chip computers, and the like.

The memory unit 104 may be non-transitory volatile memory and non-volatile memory. The memory unit 104 may be coupled for communication with the processing unit 102, such as being a computer-readable storage medium. The processing unit 102 may execute instructions and/or code stored in the memory unit 104. A variety of computer-readable instructions may be stored in and accessed from the memory unit 104. The memory unit 104 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like.

In the present embodiment, the memory unit 104 includes a command recommendation module 114 stored in the form of machine-readable instructions on any of the above-mentioned storage media and may be in communication to and executed by the processing unit 102. When the machine-readable instructions are executed by the processing unit 102, the command recommendation module 114 causes the processing unit 102 to determine a context in which a user is operating within a product data management environment. When the machine-readable instructions are executed by the processing unit 102, the command recommendation module 114 causes the processing unit 102 to dynamically determine a set of commands which are suitable for performing at least one candidate operation on a selected product data object in the product data management environment from a plurality of commands based on the determined context. The command recommendation module 114 causes the processing unit 102 to compute a score for each of the commands suitable for performing the at least one candidate operation on the selected product data object. The command recommendation module 114 causes the processing unit 102 to assign a rank to each command suitable for performing the at least one candidate operation on the product data object based on the score associated with each command. The command recommendation module 114 causes the processing unit 102 to output one or more commands from the set of commands on a graphical user interface based on the rank assigned to each command. The command recommendation module 114 causes the processing unit 102 to perform the at least one candidate operation on the selected product data object in the product data management environment using at least one command from the one or more commands. Method acts performed by the processing unit 102 to achieve the above functionality are described in greater detail in FIG. 2.

The storage unit 106 may be a non-transitory storage medium which stores a PDM database 116. The PDM database 116 stores product data and process-related information such as computer-aided design (CAD) data, models, parts information, manufacturing instructions, requirements, notes and documents. The input unit 110 may include input devices such as keypad, touch-sensitive display, camera (such as a camera receiving gesture-based inputs), etc. capable of receiving input signals such as a selection of objects in a working area. The display unit 112 may be a device with a graphical user interface displaying product data and process information and/or recommended commands along with a rank for performing operation on an object. The graphical user interface may also enable users to input a CAD command for performing operations on product data objects. The bus 108 acts as interconnect between the processing unit 102, the memory unit 104, the storage unit 106, the input unit 110, and the display unit 112.

Those of ordinary skilled in the art will appreciate that the hardware components depicted in FIG. 1 may vary for particular implementations. For example, other peripheral devices such as an optical disk drive and the like, Local Area Network (LAN)/Wide Area Network (WAN)/Wireless (e.g., Wi-Fi) adapter, graphics adapter, disk controller, input/output (I/O) adapter also may be used in addition to or in place of the hardware depicted. The depicted example is provided for the purpose of explanation only and is not meant to imply architectural limitations with respect to the present disclosure.

The product data management system 100 in accordance with an embodiment of the present disclosure includes an operating system employing a graphical user interface. The operating system permits multiple display windows to be presented in the graphical user interface simultaneously with each display window providing an interface to a different application or to a different instance of the same application. A cursor in the graphical user interface may be manipulated by a user through the pointing device. The position of the cursor may be changed and/or an event such as clicking a mouse button, generated to actuate a candidate response.

One of various commercial operating systems, such as a version of Microsoft Windows™, a product of Microsoft Corporation located in Redmond, Washington may be employed if suitably modified. The operating system is modified or created in accordance with the present disclosure as described.

Figure 2:
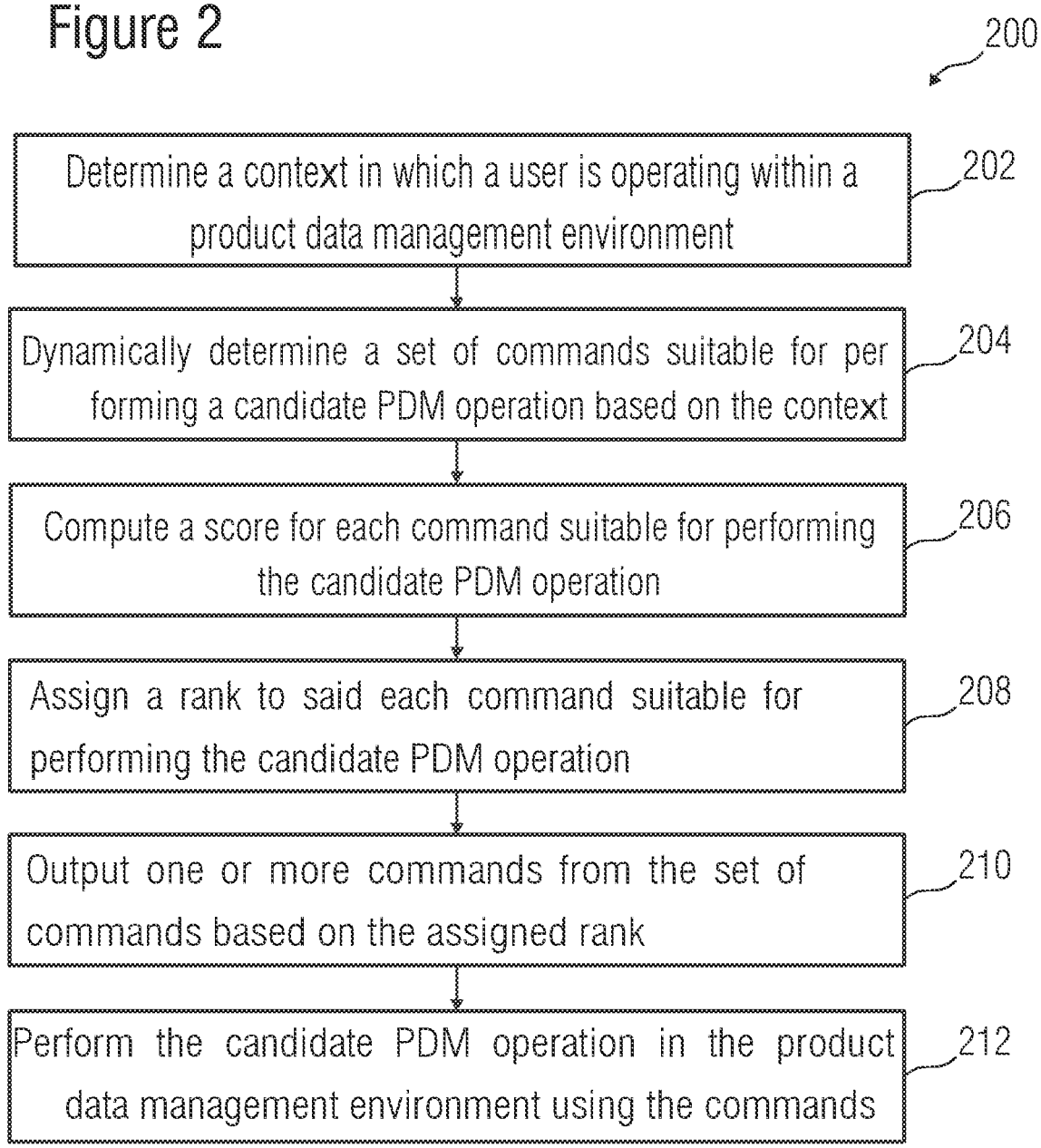
FIG. 2 is a process flowchart of an exemplary method of recommending commands to perform a PDM operation on a product data object in a product management environment, according to one embodiment.

FIG. 2 is a process flowchart 200 of an exemplary method of recommending commands to perform a PDM operation on a product data object in a product management environment, according to one embodiment. At act 202, a context in which a user is operating within a product data management environment is determined. The context in which user is operating is determined by determining a working area in the product data management environment in which the user is operating, determining type of product data objects selected by the user in the determined working area in the product data management environment, determining quantity of product data objects selected by the user in the determined working area in the product data management environment, and determining a previous command used by the user in the product data management environment.

At act 204, a set of commands which are suitable for performing at least one candidate operation in the product data management environment are dynamically determined from a plurality of commands based on the determined context. The set of commands are determined by determining at least one candidate operation likely to be performed by the user in the product data management environment based on the determined context.

At act 206, a score for each of the commands suitable for performing the at least one candidate operation is computed. In some embodiments, the score for each of the commands suitable for performing the at least one candidate operation is computed based on a combination of weight values associated with each command, number of clicks executed in the past to use each command, and time elapsed since each command was last used by the user. For example, the score (S) for each command may be computed using the below formula:

Score (S)=Count Score (C)*W, wherein Count Score (C) is computed based on number of clicks (n) executed in the past to use each command and time elapsed (d) since each command was last used by the user. The Count Score (C) may be computed using the below formula:

$$\text{Count Score } (C) = (\log_2 n * (1 + z)), \text{ wherein } z \in [-1, 1].$$

$$\text{Elapsed time factor } (z) = \begin{cases} \sqrt{\frac{d_n^2 - d^2}{d_n^2}} & \text{if } d_n > d \\ 0 & \text{if } d_n < d < 2.d_n \\ \sqrt{\frac{d^2 - d_n^2}{d_n^2}} & \text{if } 2.d_n < d < 3.d_n \end{cases}$$

where d represents number of days since last use of the command.

The combination of weight values (w) may include a first weight value ($w_e$) based on behavior of the other users and a second weight value ($w_u$) based on behavior of the user. The combination of weight values (w) is computed as follows:

$$w = \frac{w_u + w_e}{2}.$$

The method may include capturing one or more commands used by other users for performing the candidate operation on the product data objects in the working area in the product data management environment, determining a shortest sequence of commands used by at least one of the other users for performing the candidate operation on the objects in the working area in the product data management environment, and computing the first weight value associated with the one or more commands based on the shortest sequence of commands. For example, the command recommendation module 114 captures organizational best practices when a designated expert is working on their tasks.

$$\text{The first weight value } (w_e) = w_e + \left(\frac{2 - w_e}{10}\right)$$

The method may include computing the second weight value associated with each command based on the behavior of the user. The behavior of user includes history of usage of the command by the user to perform the candidate operation on the object in the working area. The method may include increasing the second weight value associated with each command based on confirmation of relevance of each command by the user (e.g., using a up vote button). The method may include decreasing the second weight value associated with each command based on confirmation of non-relevance of each command by the user (e.g., using the down vote button).

$$\text{The second weight value } (w_u) = \begin{cases} w_u + \left(\frac{2 - w_u}{10}\right) & \text{if relevant} \\ w_u^{-1} + \left(\frac{2 - w_u^{-1}}{10}\right)^{-1} & \text{if not relevant} \end{cases}$$

At act 208, a rank is assigned to each command suitable for performing the at least one candidate operation based on the score associated with each command. The command having a highest score is assigned highest rank. Similarly, the command having a lowest score is assigned a lowest rank. At act 210, one or more commands from the set of commands are outputted on a graphical user interface based on the rank assigned to each command. At act 212, the at least one candidate operation is performed in the product data management environment using at least one command from the one or more commands.

In accordance with the foregoing description, in one exemplary embodiment, the command recommendation module 114 provides an expert mode to capture organizational best practices transparently when an expert user is working on their tasks. This is achieved via a toggle in a user interface. Once the toggle is turned ON, the command recommendation module 114 transparently records the actions of the expert user, the sequence of operations, context, etc., and stores the information as expert influence. The command recommendation module 114 stops recording the expert influence after the toggle is turned OFF. Once a user starts working on the same context (e.g., user interface location, selection and previous command), the command recommendation module 114 generates a command recommendation based on history of the user as well as based the learnings from expert users. Then, the command recommendation module 114 weighs the information from the expert user to improve quality of commands suggested in the context. As the user starts gathering significant history from own actions, the command recommendation module 114 reduces the influence on command recommendation from the expert user, thus maintaining personalization of the recommended commands. To further enhance the personalization, the user is provided with "Up Vote" and "Down Vote" options, wherein clicking of the up vote button improves the rank of the recommended command and clicking down voting button reduces the rank of the recommended command.

Figure 3:
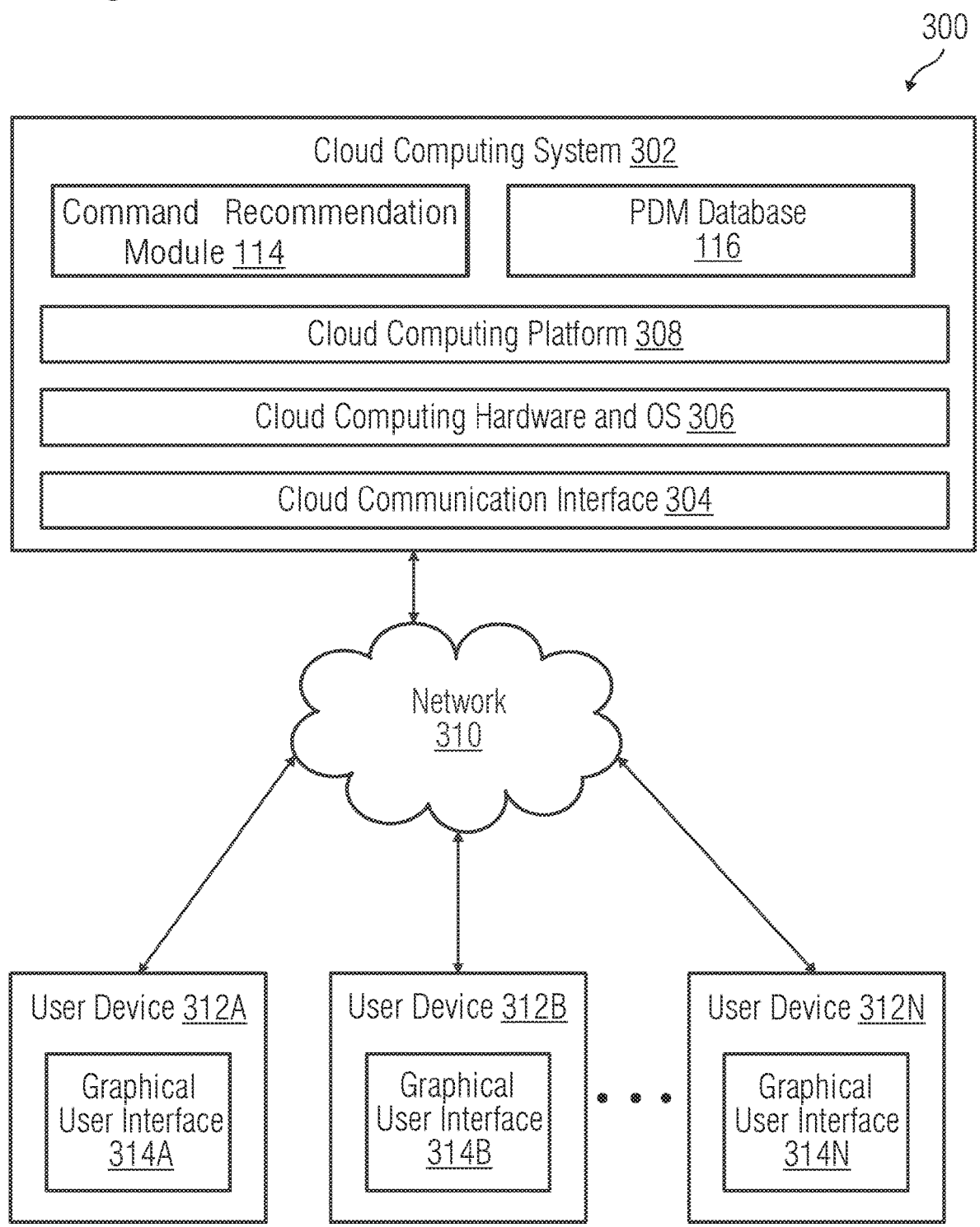
FIG. 3 is a schematic representation of a product data management system capable of recommending commands to perform a PDM operation on a product data object in a product data management environment, according to another embodiment.

FIG. 3 is a schematic representation of a product data management system 300 capable of recommending commands to perform a PDM operation on a product data object in a product data management environment, according to another embodiment. Particularly, the product data management system 300 includes a cloud computing system 302 configured for providing cloud services for managing product data and process related information.

The cloud computing system 302 includes a cloud communication interface 306, cloud computing hardware and OS 308, a cloud computing platform 310, the command recommendation module 114, and the PDM database 116. The cloud communication interface 306 enables communication between the cloud computing platform 310, and user devices 312A-N such as smart phone, tablet, computer, etc. via a network 304.

The cloud computing hardware and OS 308 may include one or more servers on which an operating system (OS) is installed and includes one or more processing units, one or more storage devices for storing data, and other peripherals required for providing cloud computing functionality. The cloud computing platform 310 is a platform which implements functionalities such as data storage, data analysis, data visualization, data communication on the cloud hardware and OS 308 via APIs and algorithm; and delivers the aforementioned cloud services using cloud based applications (e.g., product data management applications). The cloud computing platform 310 employs the command recommendation module 114 for providing recommendation of commands to perform operations on product data objects as described in FIG. 2. The cloud computing platform 310 also includes the PDM database 116 for storing product data and process-related information.

In accordance with the foregoing embodiments, the cloud computing system 302 may provide recommendation of commands to users for performing operations on product data objects in the PDM database 116. In particular, the command recommendation module 114 is configured to determine a context in which a user is operating within a product data management environment. The command recommendation module 114 is configured to dynamically determine a set of commands which are suitable for performing at least one candidate operation on a selected product data object in the product data management environment from a plurality of commands based on the determined context. The command recommendation module 114 is configured to compute a score for each of the commands suitable for performing the at least one candidate operation on the selected product data object. The command recommendation module 114 is configured to assign a rank to each command suitable for performing the at least one candidate operation on the product data object based on the score associated with each command. The command recommendation module 114 is configured to output one or more commands from the set of commands on a graphical user interface based on the rank assigned to each command. The command recommendation module 114 is configured to perform the at least one candidate operation on the selected product data object in the product data management environment using at least one command from the one or more commands. Advantageously, the cloud computing system 302 may enable users to remotely manage product data and process-related information based on the recommended commands to perform operations on the product data and process-relation information.

The user devices 312A-N include graphical user interfaces 314A-N for receiving a request to access product data and process-related information. Each of the user devices 312A-N may be provided with a communication interface for interfacing with the cloud computing system 302. Users of the user devices 312A-N can access the cloud computing system 302 via the graphical user interfaces 314A-N. The graphical user interfaces 314A-N may be specifically designed for accessing the command recommendation module 114 in the cloud computing system 302.

Figure 4:
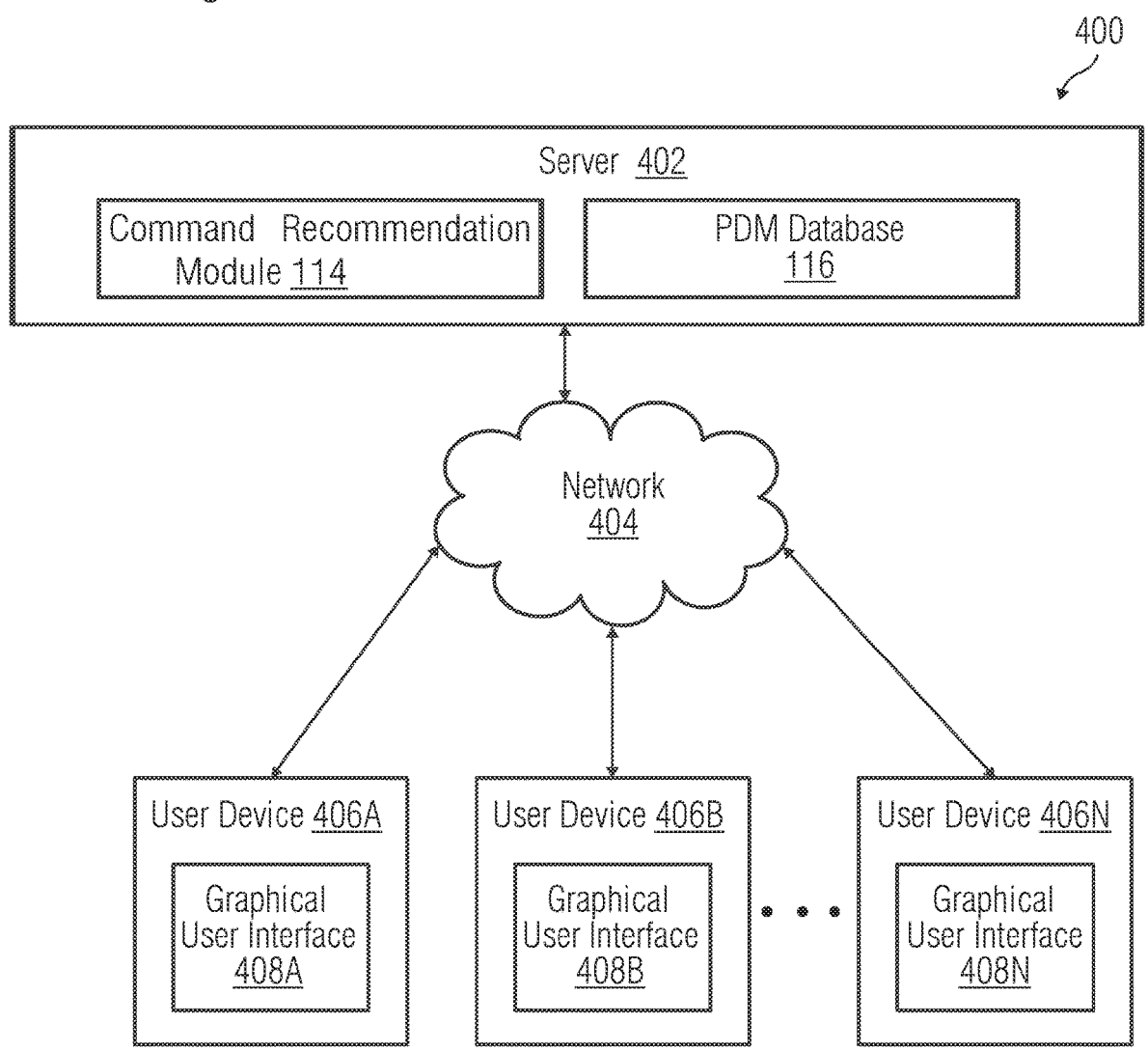
FIG. 4 illustrates a block diagram of a product data management system for providing recommendation of commands for performing a PDM operation on a product data object in a product data management environment, according to yet another embodiment.

FIG. 4 illustrates a block diagram of a product data management system 400 for providing recommendation of commands for performing a PDM operation on a product data object in a product data management environment, according to yet another embodiment. Particularly, the product data management system 400 includes a server 402 and a plurality of user devices 406A-N. Each of the user devices 406A-N is connected to the server 402 via a network 404 (e.g., Local Area Network (LAN), Wide Area Network (WAN), Wi-Fi, etc.). The product data management system 400 is another implementation of the product data management system 100 of FIG. 1, wherein the command recommendation module 114 resides in the server 402 and is accessed by user devices 406A-N via the network 404.

The server 402 includes the product data management module 114, and the PDM database 116. The server 402 may also include a processor, a memory, and a storage unit. The command recommendation module 114 may be stored on the memory in the form of machine-readable instructions and executable by the processor. The PDM database 116 may be stored in the storage unit. The server 402 may also include a communication interface for enabling communication with user devices 406A-N via the network 404.

When the machine-readable instructions are executed by the server 402, the command recommendation module 114 causes the server 402 to determine a context in which a user is operating within a product data management environment. When the machine-readable instructions are executed by the server 402, the command recommendation module 114 causes the processing unit 102 to dynamically determine a set of commands which are suitable for performing at least one candidate operation on a selected product data object in the product data management environment from a plurality of commands based on the determined context. The command recommendation module 114 causes the server 402 to compute a score for each of the commands suitable for performing the at least one candidate operation on the selected product data object. The command recommendation module 114 causes the server 402 to assign a rank to each command suitable for performing the at least one candidate operation on the product data object based on the score associated with each command. The command recommendation module 114 causes the server 402 to output one or more commands from the set of commands on a graphical user interface based on the rank assigned to each command. The command recommendation module 114 causes the server 402 to perform the at least one candidate operation on the selected product data object in the product data management environment using at least one command from the one or more commands. Method acts performed by the server 402 to achieve the above-mentioned functionality are described in greater detail in FIG. 2.

The user devices 412A-N include graphical user interfaces 414A-N for receiving a request to access product data and process-related information. Each of the user devices 412A-N may be provided with a communication interface for interfacing with the server 402. Users of the user devices 412A-N can access the server 402 via the graphical user interfaces 414A-N. The graphical user interfaces 414A-N may be specifically designed for accessing the command recommendation module 114 in the server 402.

It is to be understood that the system and methods described herein may be implemented in various forms of hardware, software, firmware, special purpose processing units, or a combination thereof. One or more of the present embodiments may take a form of a computer program product including program modules accessible from computer-usable or computer-readable medium storing program code for use by or in connection with one or more computers, processing units, or instruction execution system. For the purpose of this description, a computer-usable or computer-readable medium may be any apparatus that may contain, store, communicate, propagate, or transport the program for use by or in connection with the instruction execution system, apparatus, or device. The medium may be an electronic, magnetic, optical, electromagnetic, infrared, or semiconductor system (or apparatus or device) or a propagation mediums in and of themselves as signal carriers are not included in the definition of physical computer-readable medium including a semiconductor or solid state memory, magnetic tape, a removable computer diskette, random access memory (RAM), a read only memory (ROM), a rigid magnetic disk, optical disk such as compact disk read-only memory (CD-ROM), compact disk read/write, and digital versatile disc (DVD) or any combination thereof. Both processing units and program code for implementing each aspect of the technology may be centralized or distributed (or a combination thereof) as known to those skilled in the art.

While the present disclosure has been described in detail with reference to certain embodiments, the present disclosure is not limited to those embodiments. In view of the present disclosure, many modifications and variations would present themselves, to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within the scope.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

What is claimed is:

1. A method of dynamically recommending one or more commands for performing a product data management (PDM) operation on product data objects in a product data management environment, the method comprising:
   determining, using a processing unit, a context in which a user is operating within the product data management environment;
   dynamically determining a set of commands suitable for performing at least one candidate PDM operation on one or more product data objects in the product data management environment from a plurality of commands based on the determined context;
   computing a score for each command of the set of commands suitable for performing the at least one candidate PDM operation on the one or more product data objects, wherein the computing is based on a combination of weight values associated with each command, a number of clicks executed in a past to use each command, and a time elapsed since each command was last used by the user, and wherein the combination of weight values comprises a first weight value based on a behavior of other users and a second weight value based on a behavior of the user;
   capturing one or more commands used by the other users for performing the at least one candidate PDM operation on the one or more product data objects in a working area in the product data management environment;
   computing the first weight value associated with the one or more commands based on the captured one or more commands;
   assigning a rank to each command of the set of commands based on the score associated with each command; and
   outputting the one or more commands from the set of commands on a graphical user interface based on the rank assigned to each command.

2. The method of claim 1, further comprising:
   performing the at least one candidate PDM operation on the one or more product data objects in the product data management environment using at least one command from the one or more commands.

3. The method of claim 2, wherein the determining of the context comprises:
   determining the working area in the product data management environment in which the user is operating;
   determining a type of the one or more product data objects selected by the user in the determined working area in the product data management environment;
   determining a quantity of the one or more product data objects selected by the user in the determined working area in the product data management environment; and
   determining a previous command used by the user in the product data management environment.

4. The method of claim 3, wherein the dynamically determining of the set of commands comprises:
   determining a candidate PDM operation likely to be performed by the user in the product data management environment based on the determined context; and
   dynamically determining the set of commands suitable for performing the candidate PDM operation in the product data management environment from the plurality of commands.

5. A method of dynamically recommending one or more commands for performing a product data management (PDM) operation on product data objects in a product data management environment, the method comprising:
   determining, using a processing unit, a context in which a user is operating within the product data management environment;
   dynamically determining a set of commands suitable for performing at least one candidate PDM operation on one or more product data objects in the product data management environment from a plurality of commands based on the determined context;
   computing a score for each command of the set of commands suitable for performing the at least one candidate PDM operation on the one or more product data objects, wherein the computing is based on a combination of weight values associated with each command, a number of clicks executed in a past to use each command, and a time elapsed since each command was last used by the user, and wherein the combination of weight values comprises a first weight value based on a behavior of other users and a second weight value based on a behavior of the user;
   computing the second weight value associated with each command based on the behavior of the user, wherein the behavior of user is based on a history of usage of the commands to perform the at least one candidate PDM operation on the product data objects in a working area in the product data management environment;

increasing the second weight value associated with each command based on a confirmation of relevance of each command by the user or decreasing the second weight value associated with each command based on a confirmation of non-relevance of each command by the user;

assigning a rank to each command of the set of commands based on the score associated with each command; and outputting the one or more commands from the set of commands on a graphical user interface based on the rank assigned to each command.

6. The method of claim 5, wherein the second weight value associated with each command is increased based on a confirmation of relevance of each command by the user.

7. The method of claim 5, wherein the second weight value associated with each command is decreased based on a confirmation of non-relevance of each command by the user.

8. A product data management system comprising:
one or more processing units; and
a memory unit communicatively coupled to the one or more processing units, wherein the memory unit is configured to:
determine a context in which a user is operating within a product data management environment;
dynamically determine a set of commands suitable for performing at least one PDM candidate operation on one or more product data objects in the product data management environment from a plurality of commands based on the determined context;
compute a score for each command of the set of commands suitable for performing the at least one candidate PDM operation on the one or more product data objects, wherein the score is computed based on a combination of weight values associated with each command, a number of clicks executed in a past to use each command, and a time elapsed since each command was last used by the user, and wherein the combination of weight values comprises a first weight value based on a behavior of other users and a second weight value based on a behavior of the user;
capture one or more commands used by the other users for performing the at least one candidate PDM operation on the one or more product data objects in a working area in the product data management environment;
compute the first weight value associated with the one or more commands based on the captured one or more commands;
assign a rank to each command of the set of commands based on the score associated with each command; and
output one or more commands from the set of commands on a graphical user interface based on the rank assigned to each command.

9. The product data management system of claim 8, wherein the memory unit is further configured to:
perform the at least one candidate PDM operation on the one or more product data objects in the product data management environment using at least one command from the one or more commands.

10. The product data management system of claim 9, wherein, in determining the context in which the user is operating within the product data management environment, the memory unit is configured to:
determine a working area in the product data management environment in which the user is operating;
determine a type of the one or more product data objects selected by the user in the determined working area in the product data management environment;
determine a quantity of the one or more product data objects selected by the user in the determined working area in the product data management environment; and
determine a previous command used by the user in the product data management environment.

11. The product data management system of claim 10, wherein, in dynamically determining the set of commands, the memory unit is configured to:
determine a candidate PDM operation likely to be performed by the user in the product data management environment based on the determined context; and
dynamically determine the set of commands suitable for performing the candidate PDM operation on the one or more product data objects in the product data management environment from the plurality of commands.

12. The product data management system of claim 8, wherein the memory unit is further configured to:
compute the second weight value associated with each command based on the behavior of the user,
wherein the behavior of user is based on history of usage of the commands to perform the at least one candidate PDM operation on the one or more product data objects in the working area.

13. The product data management system of claim 12, wherein the memory unit is further configured to:
increase the second weight value associated with each command based on confirmation of relevance of each command by the user.

14. The product data management system of claim 12, wherein the memory unit is further configured to:
decrease the second weight value associated with each command based on confirmation of non-relevance of each command by the user.

* * * * *